United States Patent
Cieply et al.

(10) Patent No.: US 9,843,174 B2
(45) Date of Patent: Dec. 12, 2017

(54) RACKING INTERLOCKING SYSTEMS FOR WITHDRAWABLE CIRCUIT BREAKERS

(71) Applicant: General Electric Company, Schenectady, NY (US)

(72) Inventors: Przemyslaw Eugeniusz Cieply, Malopolskie (PL); Ryszard Rzepecki, Śląskie (PL); Andrew Matthew Candelora, East Haven, CT (US); Nagesh V. Tumu, Unionville, CT (US); Szymon Wasik, Lodzkie (PL); Alisha M. Davis, East Granby, CT (US)

(73) Assignee: General Electric Company, Schenectady, NY (US)

(*) Notice: Subject to any disclaimer, the term of this patent is extended or adjusted under 35 U.S.C. 154(b) by 2 days.

(21) Appl. No.: 15/065,014

(22) Filed: Mar. 9, 2016

(65) Prior Publication Data
US 2017/0264085 A1    Sep. 14, 2017

(51) Int. Cl.
*H02B 11/133*    (2006.01)
*H01H 9/26*    (2006.01)
(Continued)

(52) U.S. Cl.
CPC ............ *H02B 11/133* (2013.01); *H01H 9/26* (2013.01); *H01H 11/00* (2013.01); *H02B 1/06* (2013.01)

(58) Field of Classification Search
CPC .......................... H02B 11/133; H02B 11/173
See application file for complete search history.

(56) References Cited

U.S. PATENT DOCUMENTS

| 1,791,446 A | 2/1931 | French |
|---|---|---|
| 2,777,024 A | 1/1957 | West |

(Continued)

FOREIGN PATENT DOCUMENTS

| CA | 1075745 | 4/1980 |
|---|---|---|
| CN | 101834098 A | 9/2010 |

(Continued)

OTHER PUBLICATIONS

Imming et al., Fixed or Withdrawable Switchgear—Withdrawable switchgear, past or future, Petroleum and Chemical Industry Conference Europe Conference Proceedings (PCIC Europe), Jun. 7-9, 2011, 6 pages.

(Continued)

*Primary Examiner* — Robert J Hoffberg
(74) *Attorney, Agent, or Firm* — General Electric Company

(57) ABSTRACT

An interlocking system for a circuit breaker assembly including a circuit breaker having a plurality of contacts includes a racking screw coupled to the contacts that changes a position of the circuit breaker when engaged by a tool. The interlocking system also includes a front panel defining an opening through which the racking screw is accessible, an access door coupled to the front panel and configured to selectively cover the opening, and an access door stopper coupled to the front panel. The interlocking system also includes a trip assembly coupled to the access door stopper. Each of the access door, the access door stopper, and the trip assembly are moveable between a first position and a second position such that moving to the first position triggers delivery of a trip signal to the circuit breakers to open the plurality of contacts, and wherein, in the second position, the access door is fully open to enable access to the racking screw through the front panel.

20 Claims, 17 Drawing Sheets

(51) Int. Cl.
  *H01H 11/00* (2006.01)
  *H02B 1/06* (2006.01)

(56) References Cited

U.S. PATENT DOCUMENTS

| | | | |
|---|---|---|---|
| 2,916,571 A | | 12/1959 | Gallant et al. |
| 3,219,771 A | | 11/1965 | Umphrey |
| 3,288,956 A | | 11/1966 | Jencks et al. |
| 4,041,260 A | | 8/1977 | Swindler et al. |
| 4,206,329 A | | 6/1980 | Jarosz |
| 4,686,334 A | | 8/1987 | Nebon et al. |
| 4,703,137 A | | 10/1987 | Bohnen et al. |
| 4,728,757 A | | 3/1988 | Buxton et al. |
| 4,926,286 A | * | 5/1990 | Maki ............... H02B 1/14 200/50.17 |
| 5,164,883 A | | 11/1992 | Little et al. |
| 5,200,585 A | | 4/1993 | Davies et al. |
| 5,337,210 A | | 8/1994 | Ishikawa et al. |
| 5,691,518 A | | 11/1997 | Jones et al. |
| 6,545,234 B1 | | 4/2003 | Trivette et al. |
| 6,900,400 B2 | | 5/2005 | Rohlfing |
| 7,022,923 B2 | | 4/2006 | Liebetruth |
| 7,053,321 B2 | | 5/2006 | Leccia et al. |
| 7,067,746 B2 | | 6/2006 | Deylitz |
| 7,821,775 B2 | | 10/2010 | Narayanasamy et al. |
| 7,903,393 B2 | | 3/2011 | Buxton et al. |
| 7,965,493 B2 | * | 6/2011 | Leeman ............ H02B 11/127 200/50.17 |
| 7,978,458 B2 | | 7/2011 | Bohnen |
| 8,243,422 B2 | * | 8/2012 | Leeman ............ H02B 11/127 200/50.17 |
| 8,299,377 B2 | | 10/2012 | Jurek et al. |
| 9,451,718 B2 | * | 9/2016 | Oneufer ............ H02B 1/36 |
| 9,531,169 B2 | * | 12/2016 | Oneufer ............ H02B 1/46 |
| 2017/0063056 A1 | * | 3/2017 | Oneufer ............ H02B 1/46 |

FOREIGN PATENT DOCUMENTS

| | | | |
|---|---|---|---|
| DE | 11 27 993 B | 4/1962 | |
| EP | 0269814 A1 * | 6/1988 | ............ H01H 9/26 |
| EP | 1 231 691 A1 | 8/2002 | |
| EP | 2 228 878 A2 | 9/2010 | |

OTHER PUBLICATIONS

Notice of Allowance towards related U.S. Appl. No. 13/017,348 dated Jul. 18, 2012.

Extended European Search Report and Opinion issued in connection with related EP Application No. 12152772.5 dated Jan. 20, 2014.

First Office Action and Search issued in connection with related CN Application No. 201210028464.4 dated Jun. 17, 2014.

Office Action issued in connection with related EP Application No. 12152772.5 dated Oct. 31, 2016.

International Search Report and Written Opinion issued in connection with corresponding PCT Application No. PCT/US2017/016874 dated Apr. 18, 2017.

* cited by examiner

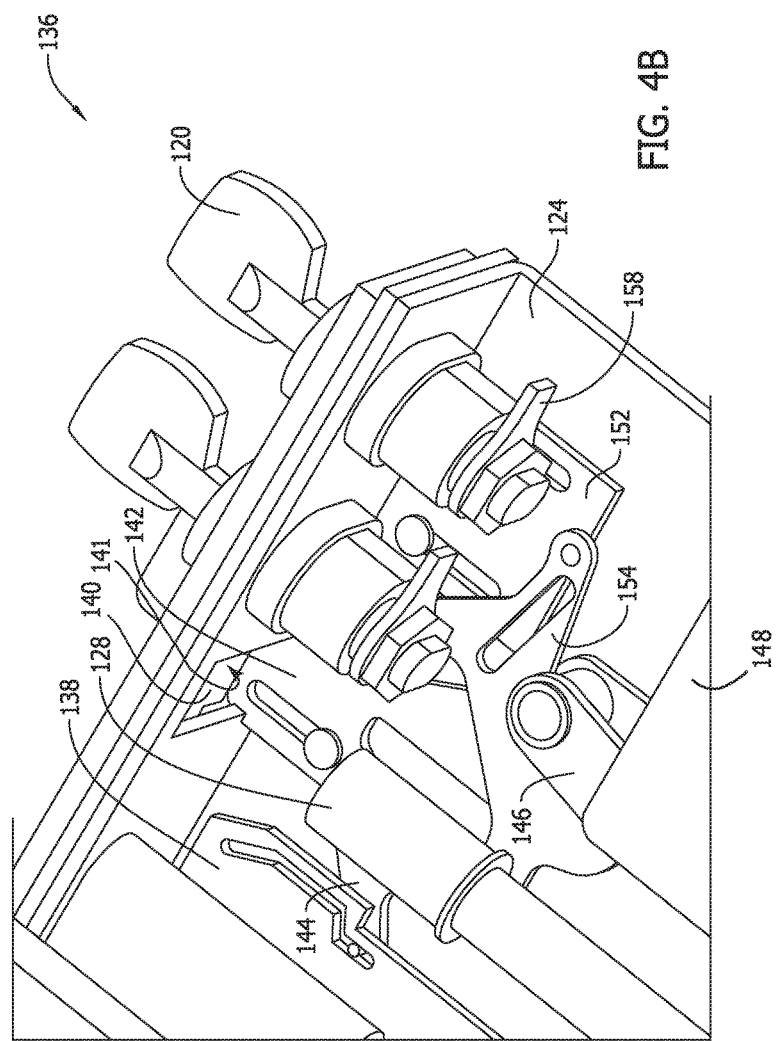

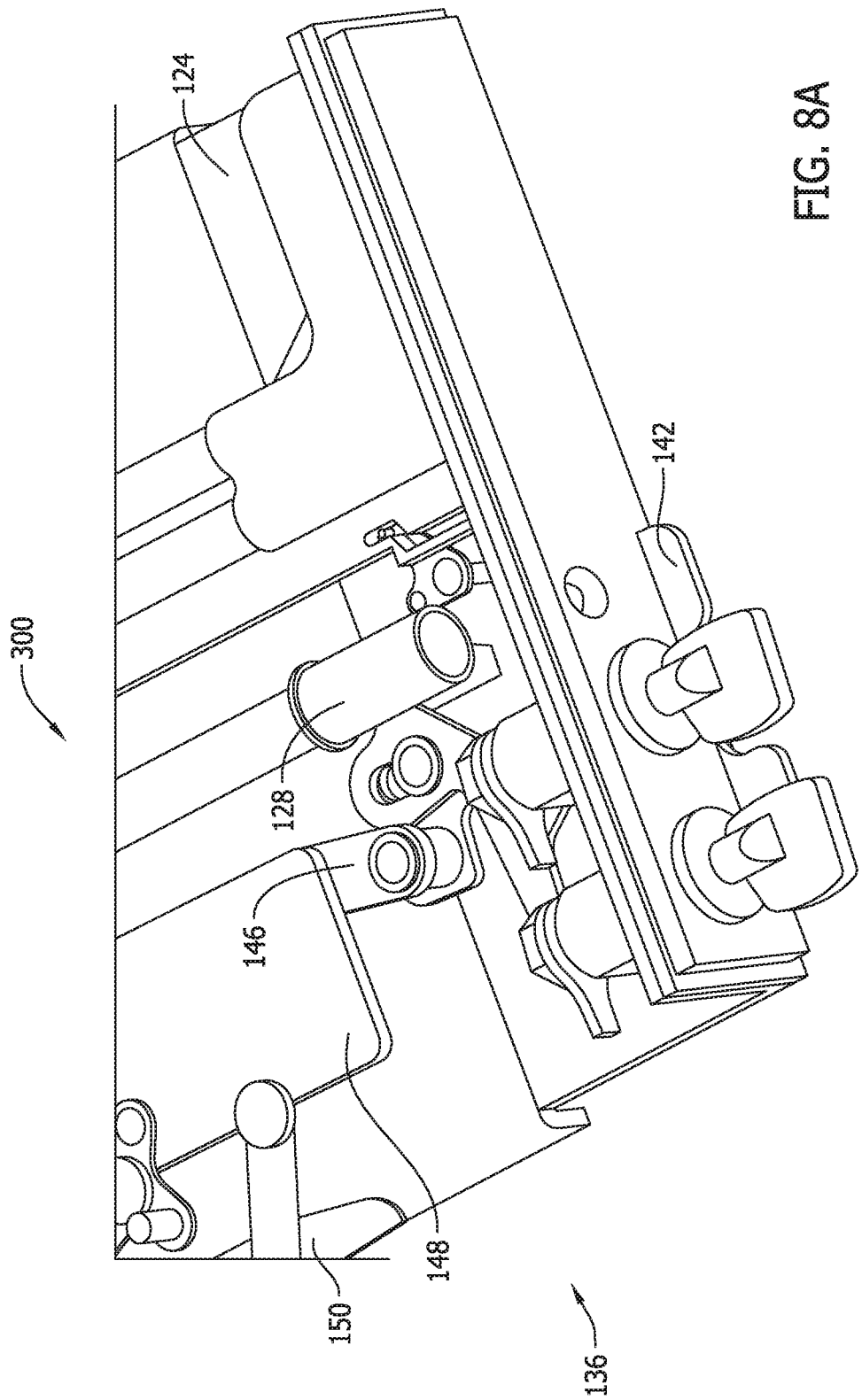

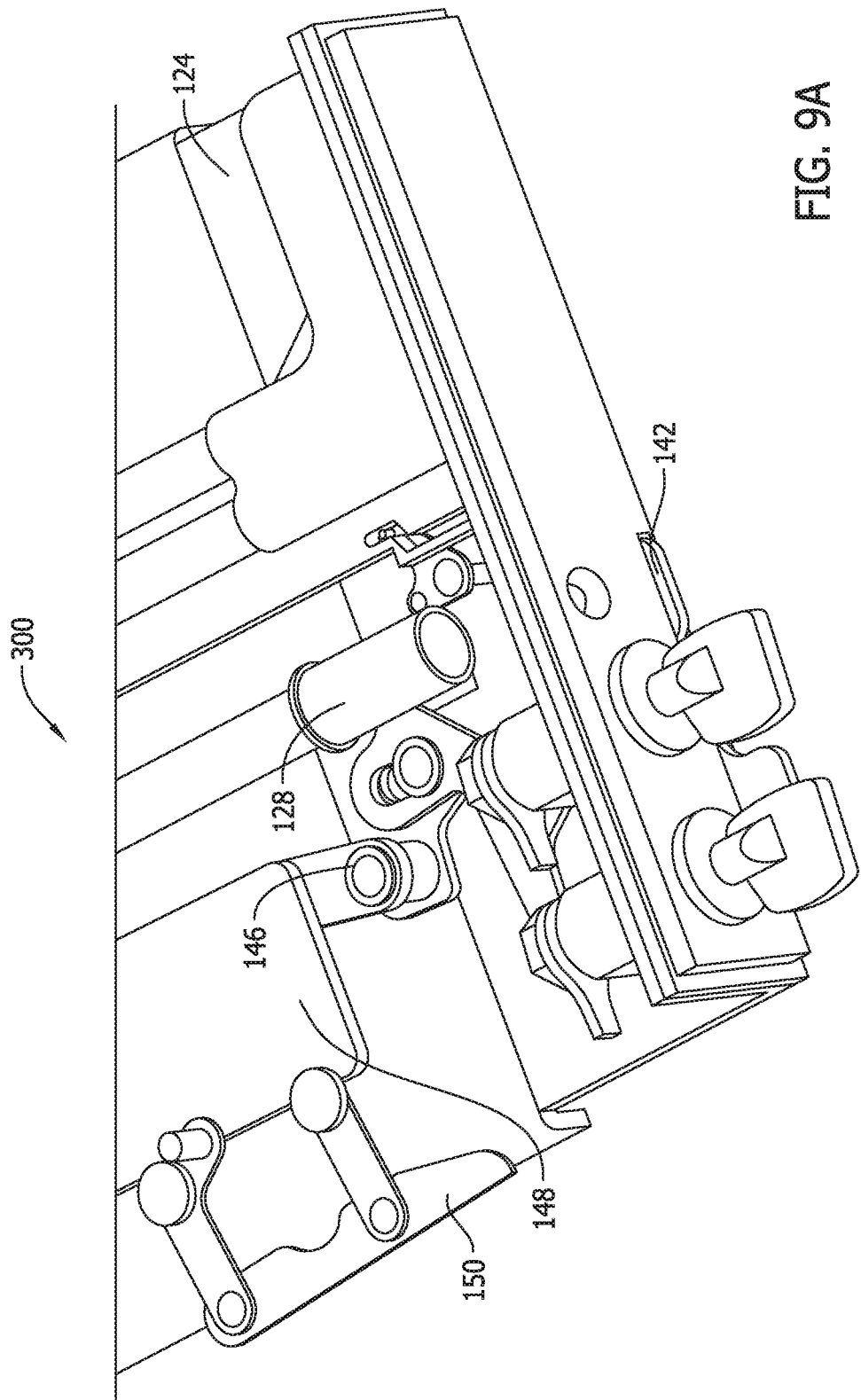

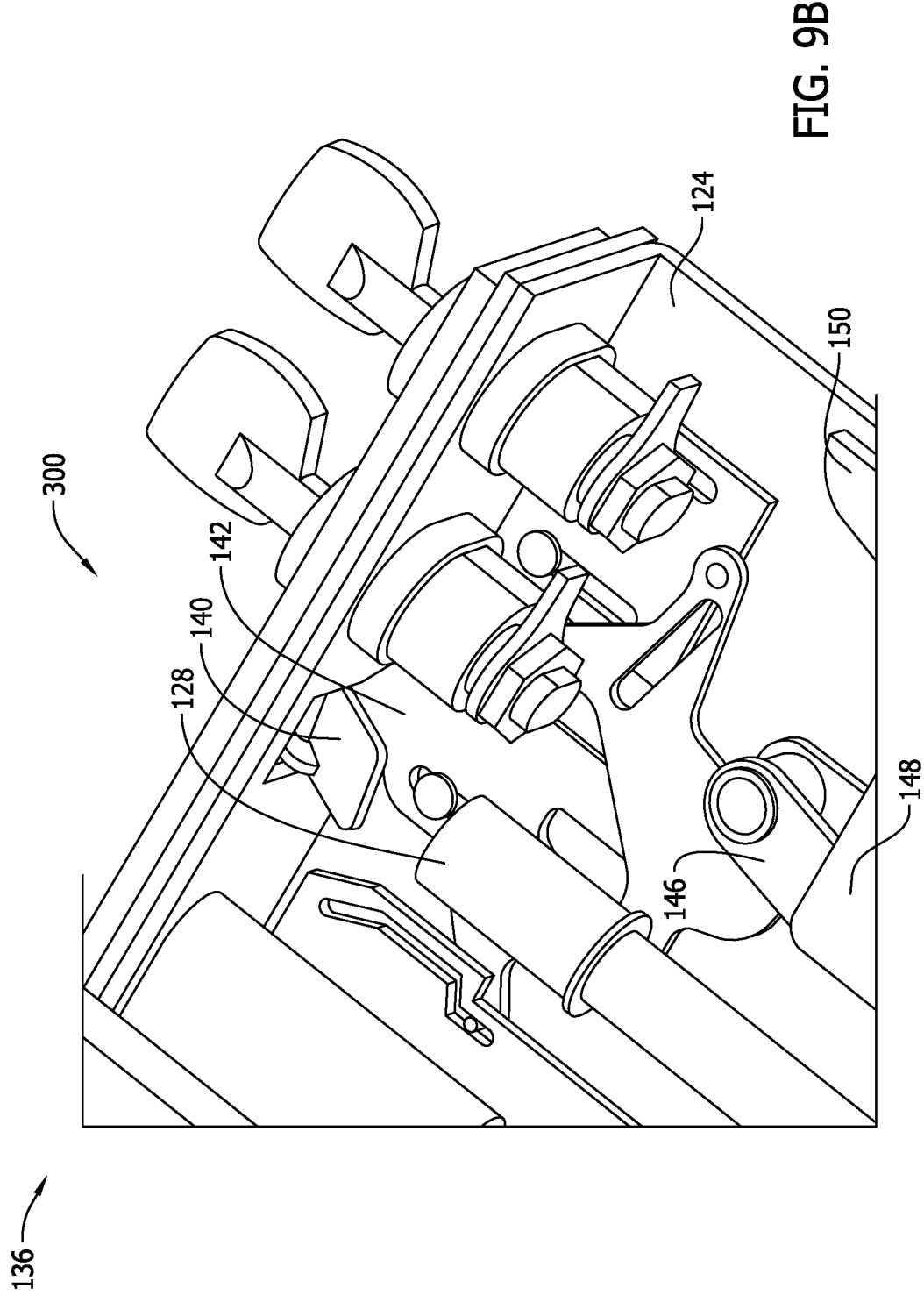

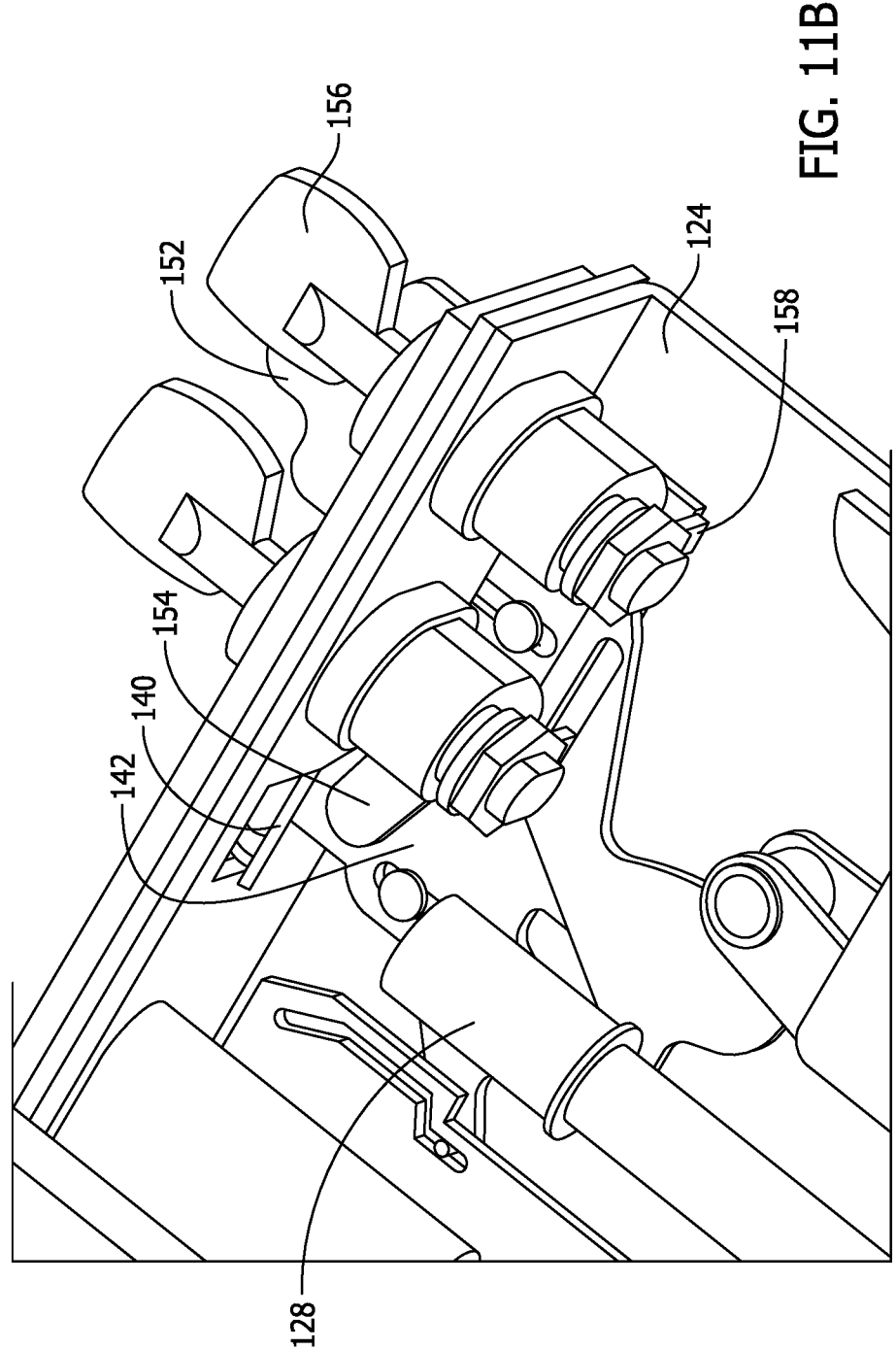

RACKING INTERLOCKING SYSTEMS FOR WITHDRAWABLE CIRCUIT BREAKERS

BACKGROUND

The field of the disclosure relates generally to power equipment and, more particularly, to a locking mechanism for use with power equipment.

Electrical systems, such as power generation, power transmission, power distribution, and power conversion systems, often include switchgear used to control, protect, and/or isolate electrical equipment within the electrical system. Switchgear often serves as connectors between power supplies and power loads to protect and control low voltage circuits. Switchgear generally includes a switch cabinet that houses a switch unit that includes bus bars, electrical cables, circuit breakers, electrical switches, and/or fuses electrically connected in a desired manner to control, protect, and/or isolate the electrical equipment of electrical systems. Circuit breakers generally include contact arms and a trip mechanism coupled together to open the current path in case of a fault detection. The contact arms in circuit breakers are used to close the current path within the breaker. Once the circuit is closed, power flows through the breaker.

At least some known circuit breakers include terminals that are permanently coupled to the busbar system within the switchgear cabinet. Some such breakers include draw-out units that are used to provide an option to remove the breaker from the cabinet for servicing without disconnecting the draw-out unit from the switchgear. At least some known for circuit breakers, for example, generally use external locking mechanisms to prevent the carriage assembly from being installed or "racked in" within the switchgear to a service position. For example, at least some known circuit breaker carriage assemblies use a system of gears to facilitate inserting circuit breaker to a service position within the switchgear or to partially withdraw from the switchgear the circuit breakers to a test position. To prevent the circuit breaker from being racked in and receiving power during service, a brake may be provided that engages the gear system. Moreover, some known circuit breaker carriage assemblies use covers, such as switch covers, that prevent the circuit breaker from receiving power during service. Other known circuit breaker carriage assemblies can include a block or stopper that prevents the circuit breaker from being racked in. However, additional parts, such as brakes, covers, padlocks, and/or blocks can be lost or damaged during transport or in storage. Moreover, each of these mechanisms is external to the circuit breaker and/or the carriage assembly, which can lead to damage during use. Accordingly, it is desirable to provide a locking mechanism that is internal to the carriage assembly and does not require additional separate parts.

BRIEF DESCRIPTION

In one aspect, a method assembling a draw-out breaker assembly including a circuit breaker having a plurality of contacts is provided. The method includes coupling an interlock system to a front panel of a base assembly, and more specifically, coupling an access door to the front panel such that the access door selectively covers an opening formed in the front panel, coupling an access door stopper to the front panel and to the access door, wherein the access door stopper is selectively moveable between a trip position and an open position, and coupling a racking screw to the front panel and to the plurality of contacts. The method also includes coupling a trip assembly to the front panel and to the access door stopper, wherein the trip assembly is selectively moveable between a trip position and an open position, such that i) when the access door stopper is in the trip position, ii) when the trip assembly is moved to the trip position by the access door stopper to engage a trip bar of the circuit breaker, and iii) when the access door is partially opened such that access to the racking screw through the opening is prevented, a mechanical trip signal is provided to the circuit breaker to position the plurality of contacts in an open position, and such that: i) when the access door stopper is moved to the open position, ii) when the trip assembly is moved to the open position by the access door stopper, and iii) when the door is fully opened by the trip assembly to enable access to the racking screw, the position of the plurality of contacts is confirmed.

In another aspect, an interlocking system for a draw-out circuit breaker assembly including a circuit breaker having a plurality of contacts is provided. The interlocking system includes a racking screw coupled to the plurality of contacts that changes a position of the circuit breaker within the draw-out circuit breaker assembly when engaged by a tool. The interlocking system also includes a front panel defining an opening through which the racking screw is selectively accessible, an access door coupled to the front panel and configured selectively cover the opening to selectively provide access to the racking screw, and an access door stopper coupled to and at least partially extending through the front panel. The access door stopper is configured to limit movement of the access door based on the position of the plurality of contacts. The interlocking system also includes a trip assembly coupled to the access door stopper. Each of the access door, the access door stopper, and the trip assembly are moveable between a first position and a second position such that moving the access door, the access door stopper, and the trip assembly to the first position triggers delivery of a trip signal to the circuit breakers to open the plurality of contacts, and wherein, in the second position the access door is fully open to enable access to the racking screw through the front panel.

BRIEF DESCRIPTION OF THE DRAWINGS

FIG. 4B is a rear perspective view of the interlocking system of the draw-out breaker assembly shown in FIG. 1 in the rest position

FIG. 8A is a front perspective view of the interlocking system of the draw-out breaker assembly shown in FIG. 1 in a trip position;

FIG. 9A is a front perspective view of the interlocking system of the draw-out breaker assembly shown in FIG. 1 in the trip position when the contacts of the breaker are in the open position;

FIG. 9B is a rear perspective view of the interlocking system of the draw-out breaker assembly shown in FIG. 1 in a trip position when the contacts of the breaker are in the open position;

FIG. 11B is a rear perspective view of the interlocking system of the draw-out breaker assembly shown in FIG. 1 in a trip position when the contacts of the breaker are in the open position and the breaker is locked;

DETAILED DESCRIPTION

Exemplary embodiments of apparatuses are described herein for use in preventing power from being applied to devices, such as a circuit breaker, when the devices are not fully engaged within a draw-out assembly. These embodiments facilitate safer operation of a circuit breaker. The systems, method, and apparatus described herein facilitate a method for racking a circuit breaker in a draw-out breaker assembly. In particular, the systems, method, and apparatus described herein include an interlocking system that provides a trip signal to the circuit breaker to position a plurality of breaker contacts in an open position. To provide the trip signal, the interlocking system is moved to a trip position. More specifically, an access door stopper is actuated to the trip position, which causes an access door to partially open preventing access to a racking screw, and also causes actuation of a trip assembly to the trip position to engage and rotate a trip bar of the circuit breaker to facilitate tripping the breaker and opening the contacts.

Furthermore, the interlocking system verifies the position of the contacts to confirm that the contacts are indeed open and that a failure has not occurred. In the event of a failure, a contacts position indicator of the interlocking assembly moves from an open position to a failure position and extends from the breaker into the path of the trip assembly. To verify the position, the interlocking system is moved to an open position. More specifically, the access door stopper is actuated to the open position, which causes actuation of a trip assembly to the open position. If there is no failure and the contacts are open, then the trip assembly moves past and does not contact the contacts position indictor, and the access door is able to fully open allowing access to the racking screw. If there has been a failure and the contacts are closed, the trip assembly will contact the contacts position indicator and prevent trip assembly from further actuation, which prevents the access door from fully opening, therefore preventing access to the racking screw.

Figure 1:
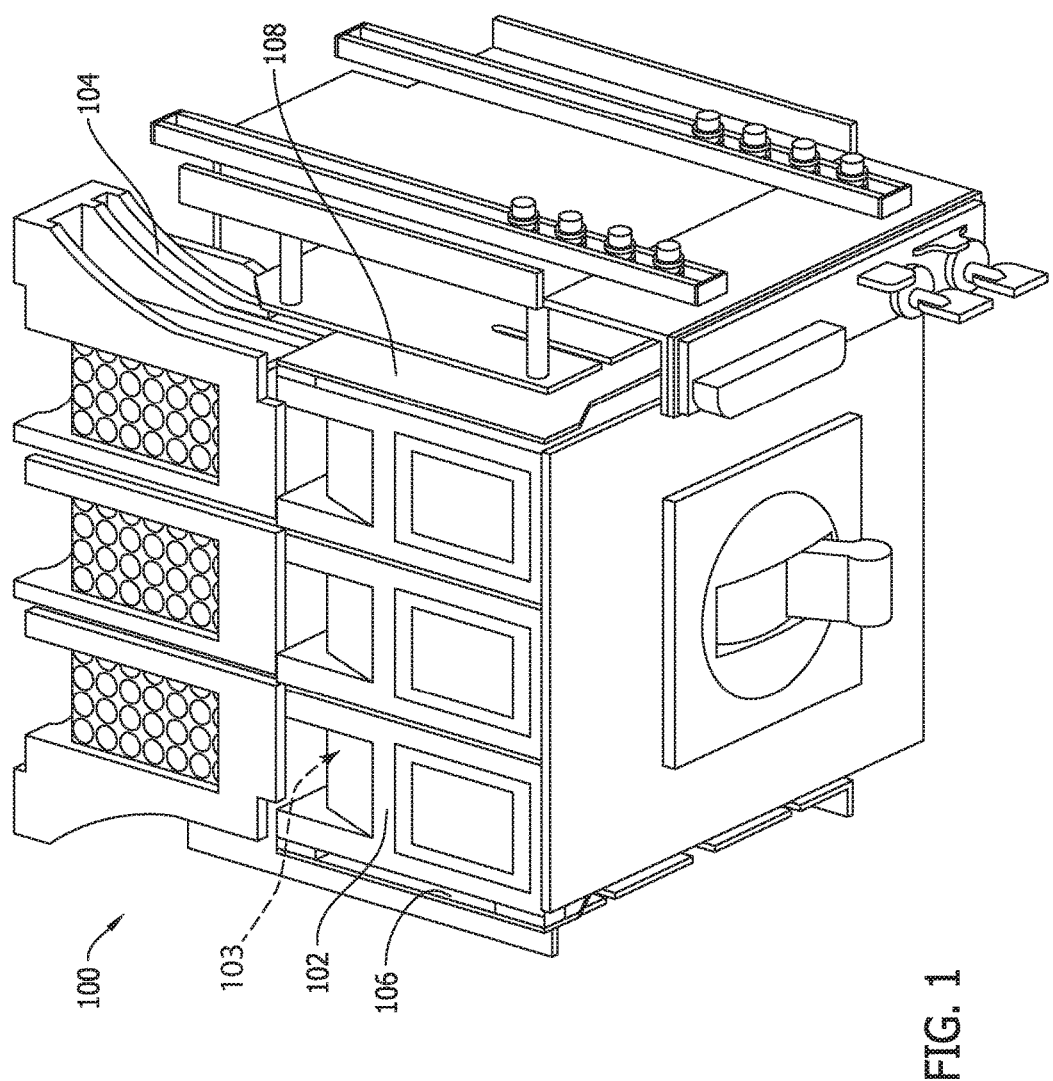
FIG. 1 is a perspective view of an exemplary draw-out breaker assembly.
Figure 2:
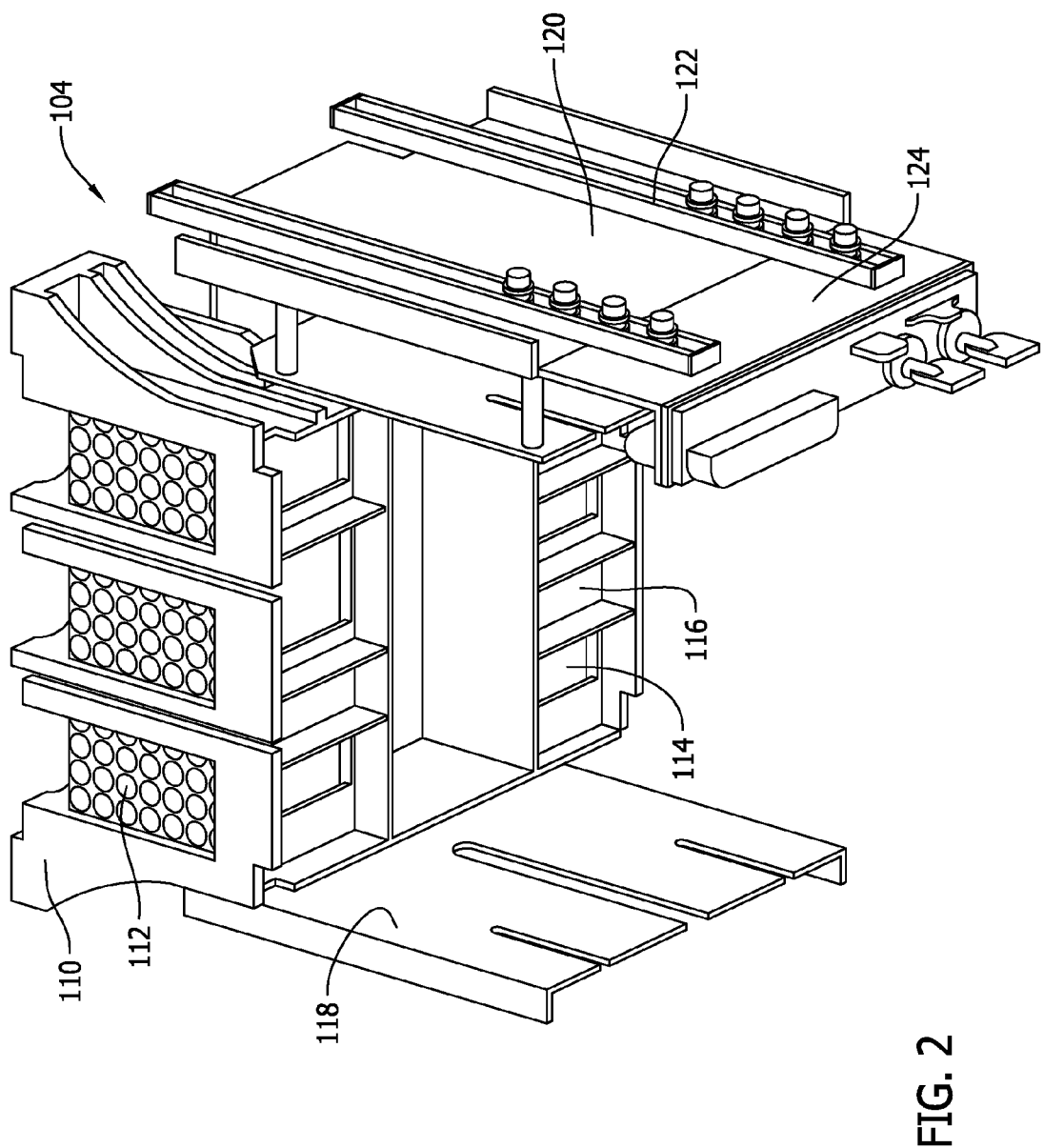
FIG. 2 is a perspective view of the draw-out breaker shown in FIG. 1 with the breaker removed illustrating an exemplary base assembly.

FIG. 1 is a perspective view of an exemplary draw-out breaker assembly 100 including a circuit breaker 102 and a base assembly 104. FIG. 2 is a perspective view of draw-out breaker assembly 100 with breaker 102 removed illustrating base assembly 104. In the exemplary embodiment, breaker 102 is coupled to base assembly 104 by a first side sheet 106 and an opposing second side sheet 108. Breaker 102 is removable from base assembly 104 and from a main power circuit (not shown) without requiring disassembly of the fixed connection between breaker connection terminals 103 and a busbar system (not shown) of the main power circuit. Side sheets 106 and 108 are positioned on either side of breaker 102 and facilitate withdrawal of breaker 102 from base assembly 104. In the exemplary embodiment, base assembly 104 includes a base 110 including a plurality of connection terminals 112, a plurality of shutters 114, and a plurality of shutter covers 116. Shutters 114 cover terminals 112 to protect against access to electrically live components when breaker 102 is removed from base assembly 104. Base assembly 104 also includes a first side plate 118 and an opposing second side plate 120, which are both coupled to base 110 on either side of breaker 102 outside of side sheets 106 and 108. Side plate 120 includes a height adjustment system 122 and a front panel 124, the height of which is adjustable using height adjustment system 122.

Figure 3:
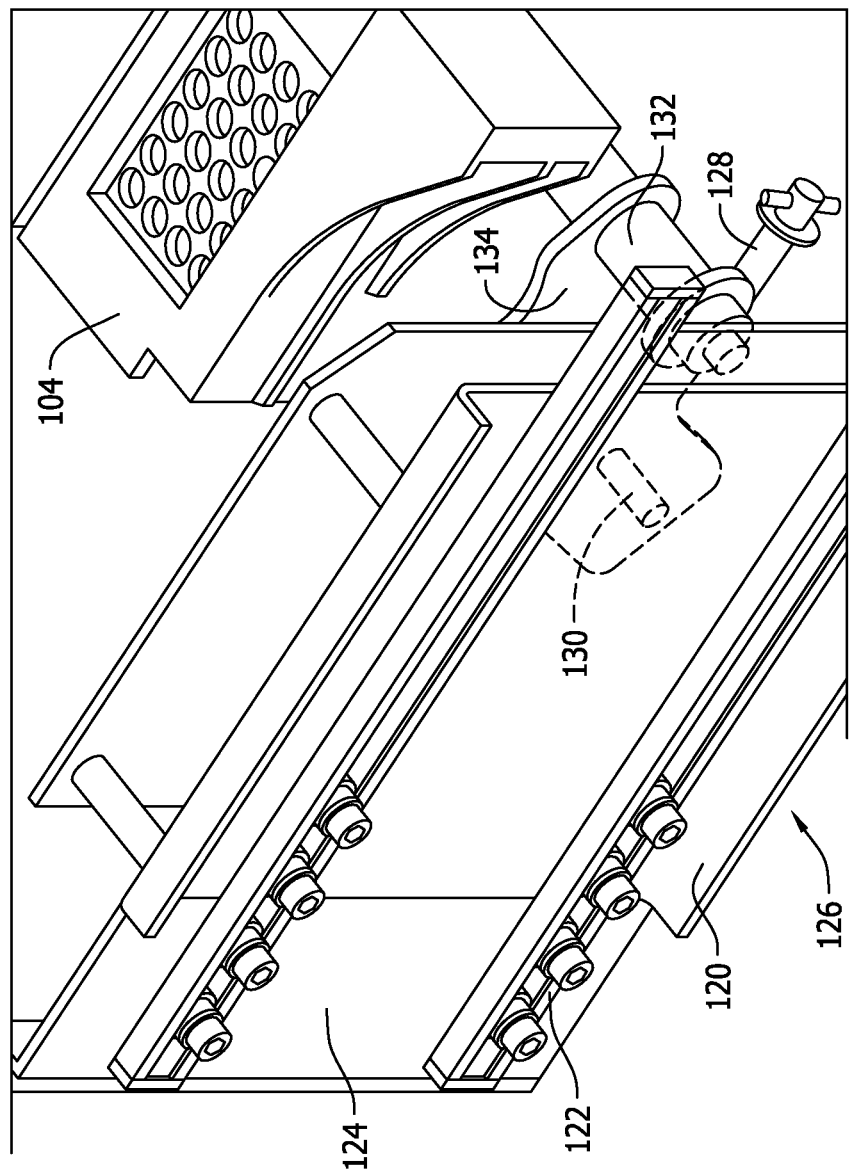
FIG. 3 is a perspective view of an exemplary racking system that may be used with the draw-out breaker assembly shown in FIG. 1.

FIG. 3 is a perspective view of an exemplary racking system 126 that may be used with draw-out breaker assembly 100. In the exemplary embodiment, racking system 126 is coupled to second side plate 120 and includes a racking screw 128, a racking screw nut 130, and a cross shaft 132 having a racking cam 134. Rotational movement of racking screw 128 causes linear movement of racking screw nut 130 on racking screw 128 itself, which causes rotation of cross shaft 132. Cam 134 is coupled to cross shaft 132 and are engaged with side sheets 106 and 108 (shown in FIG. 1) such that rotation of cross shaft 132 causes rotation of cam 134 to facilitate racking in or racking out of breaker 102, depending on the direction of racking screw 128 rotation.

Figure 4A:
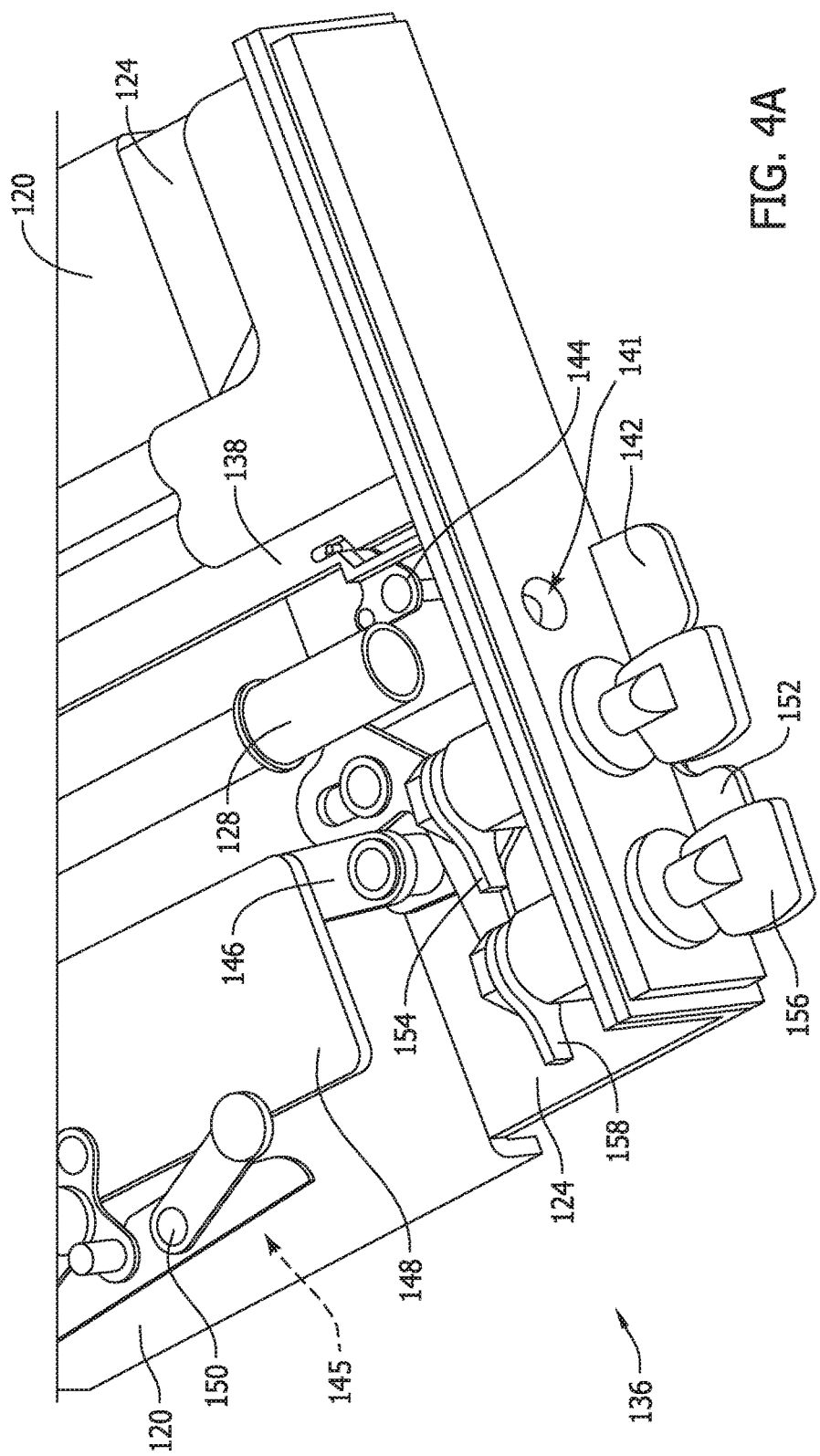
FIG. 4A is a front perspective view of an exemplary interlocking system of the draw-out breaker assembly shown in FIG. 1 in a rest position.

FIG. 4A is a front perspective view of an exemplary interlocking system 136 of draw-out breaker assembly 100 in a rest position, and FIG. 4B is a rear perspective view of interlocking system 136 in the rest position. In the exemplary embodiment, interlocking system 136 includes a plurality of mechanically linked cams that enable mechanical interlocking of rack-in/out operation. Interlocking system 136 prevent engagement/disengagement of the main circuit while main contacts 103 of withdrawable breaker 102 (shown in FIG. 1) are closed. Once the main contacts 103 of breaker 102 are closed, the operator has no access to racking screw 128, and, therefore, breaker 102 cannot change its position with respect to draw-out base assembly 104.

In the exemplary embodiment, interlocking system 136 includes a position indication link 138 that is engaged by racking nut 130 (shown in FIG. 3) to provide the operator with a visual indication of the position of breaker 102 within draw-out assembly 100. Interlocking system 136 also includes a racking access door 140 coupled to front panel 124 to selectively cover an opening defined in the front panel. Interlocking system 136 also includes an access door stopper 142 coupled to and partially extending through front panel 124. Access door stopper 142 is coupled to access door 140 and limits movement of access door 140. In the rest position, as described in further detail below, stopper 142 prevents access door 140 from opening to prevent access to racking screw 128 through an opening 141. When racking access door stopper 142 is pressed in from the rest position, stopper 142 provides a trip signal to breaker 102 and at the same moment releases racking access door 140, thus providing access to racking access screw 128. A locking cam 144 is engaged to and driven by position indication link 138 and facilitates locking access door stopper 142 in an activated position to provide a permanent trip signal to breaker 102. In such a configuration, breaker contacts 103 cannot be closed.

Furthermore, interlocking system 136 includes trip assembly 145 including a trip link 146, an actuation slider 148, and an actuation cam system 150. Trip link 146 is mechanically coupled to racking access door stopper 142 and transfers movement of the racking access door stopper 142 to actuation slider 148. Activation slider 148, in turn, activates actuation cam system 150 to provide a trip signal to breaker 102 when it is required to open breaker contacts 103 prior to racking of breaker 102 inside draw-out base assembly 104.

In the exemplary embodiment, interlocking system 136 also includes a locking link or padlock slider 152 coupled to a lever link or intermediate lever 154 that allows breaker 102 to be locked only when breaker contacts 103 are open. Locking of draw-out assembly 100 can be executed in two ways: 1) by installing padlocks on padlock slider 152; or 2) by using a key-lock 156 with a corresponding key lock latch 158 that hold intermediate lever 154 in the locked position. When draw-out assembly 100 is locked, a permanent trip signal is provided to breaker 102 that prevents breaker contacts 103 from being closed.

Figure 5:
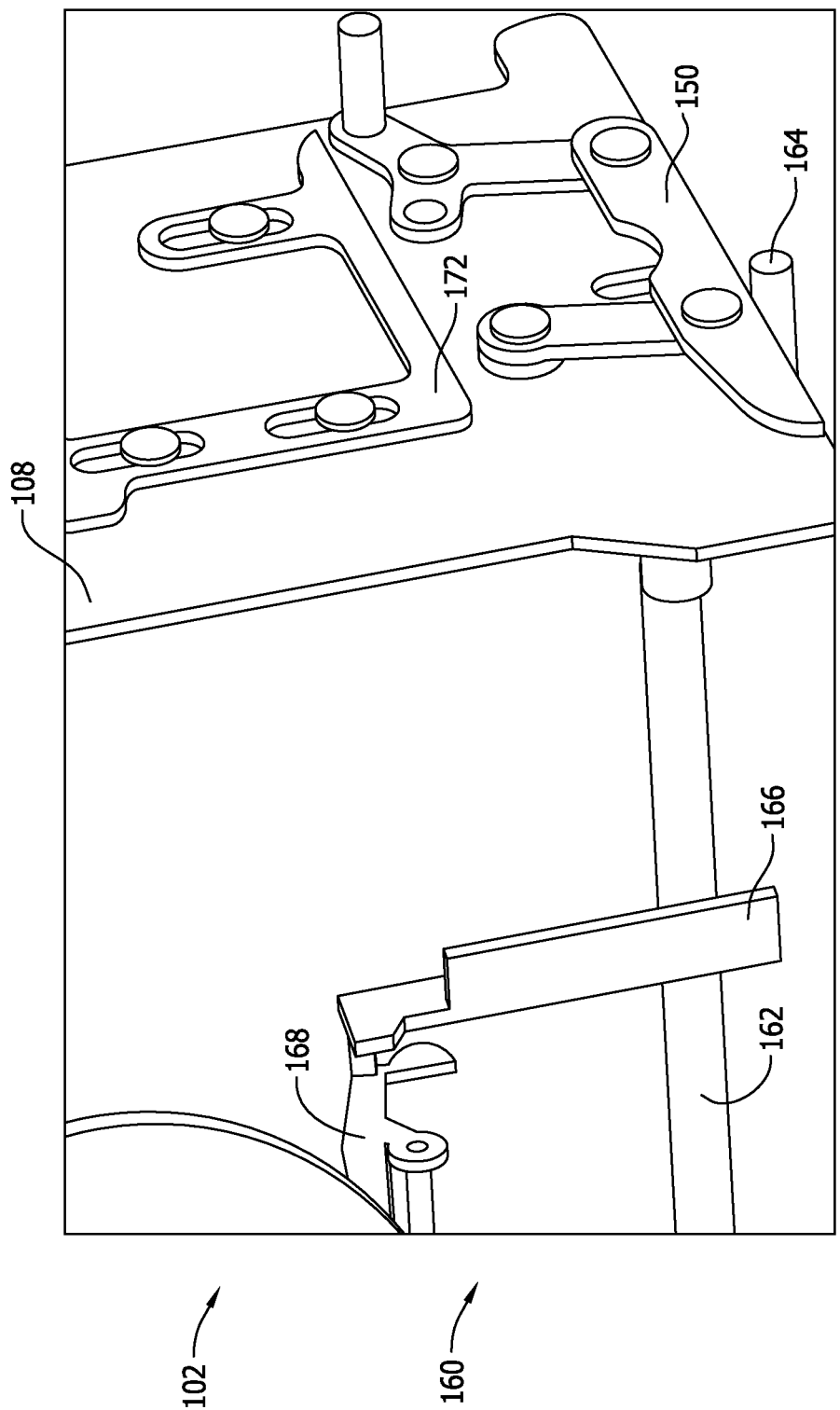
FIG. 5 is a front perspective view of an exemplary trip interface of the draw-out breaker assembly shown in FIG. 1.
Figure 6:
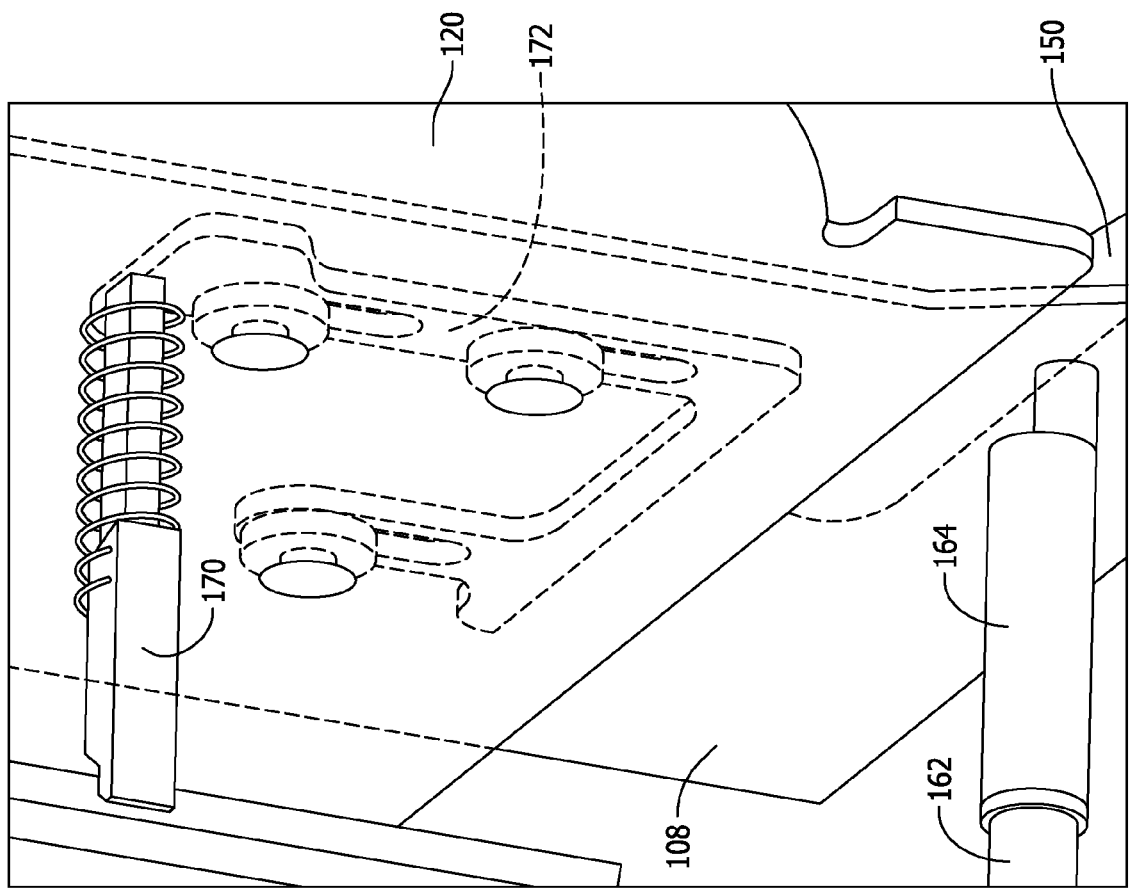
FIG. 6 is a front perspective view of the trip interface of the draw-out breaker assembly shown in FIG. 1.

FIG. 5 is a perspective outside view of an exemplary trip interface 160 of breaker 102, and FIG. 6 is a perspective inside view of trip interface 160. In the exemplary embodiment, trip interface 160 is a component of breaker 102 and includes a trip bar 162, a trip bar extension 164, and an actuator 166. Actuation cam system 150, which is driven by other components of interlocking system 136, engages trip bar extension 164 to cause rotation of trip bar 162 within breaker 102. Rotational movement of trip bar 162 causes linear movement of actuator 166 that acts on a breaker mechanism 168 to trip breaker 102, causing breaker contacts 103 to open. When trip bar 162 is held in its activated position, a permanent trip signal is provided to breaker mechanism 168, which prevents closure of breaker contacts 103. In such a configuration, when breaker contacts 103 contacts are open, a contacts position indicator 170 is withdrawn inside breaker 102 and allows a slider 172 to move up to enable full rotation of actuation cam system 150.

If breaker contacts 103 didn't open after providing a trip signal to breaker mechanism 168 (failure mode), slider 172 cannot move up, and full rotation of the actuating cams system 150 is not possible, and full movement of racking access door stopper 142 is prevented. In such a case, racking access door 140 cannot be opened such that access to racking screw 128 is prevented and breaker 102 position inside draw-out assembly 100 cannot be changed, thus eliminating the risk of electric shock to the operator.

Figure 7:
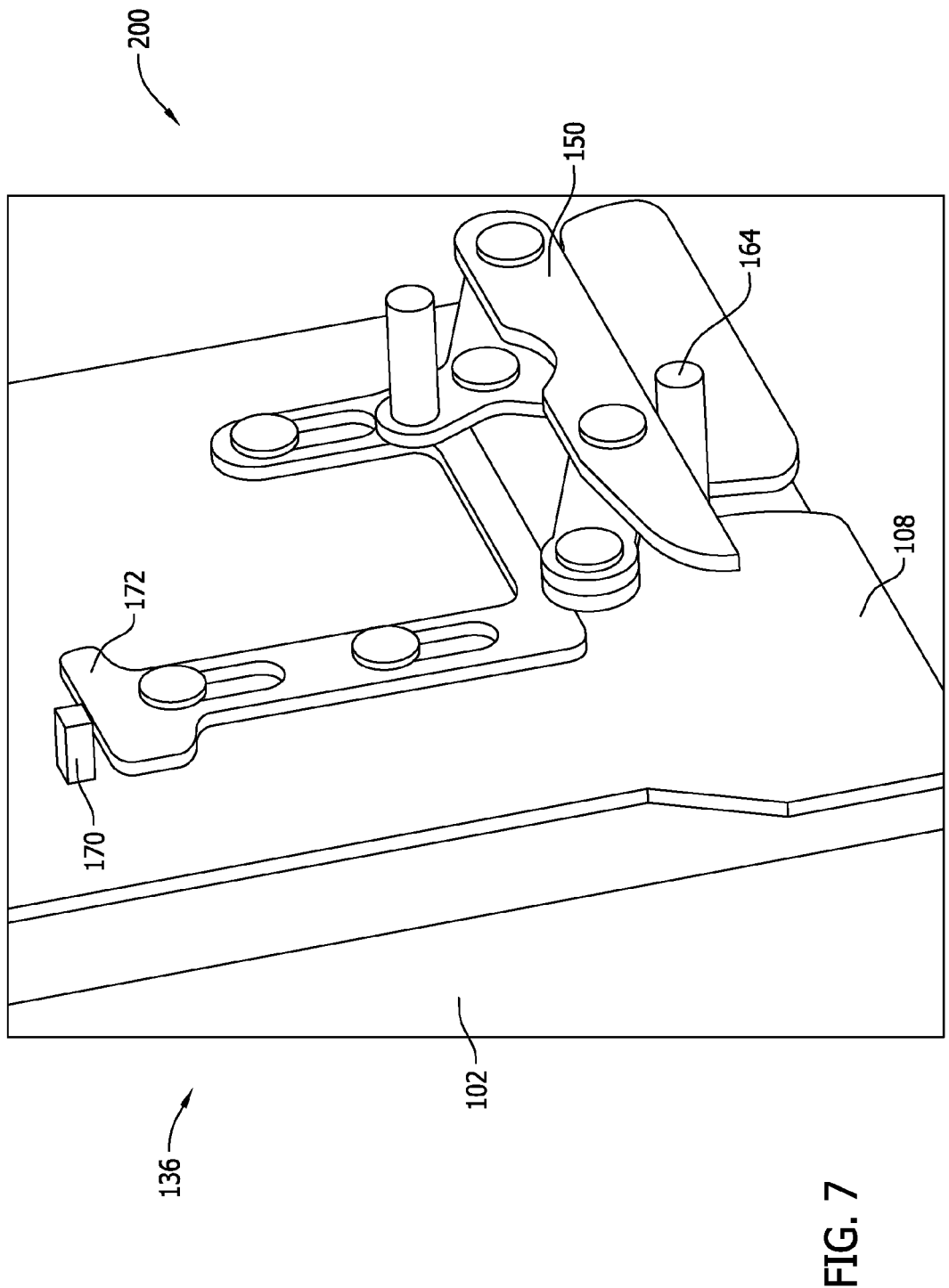
FIG. 7 is a front perspective view of the interlocking system of the draw-out breaker assembly shown in FIG. 1 in the rest position.

FIG. 7 is a front perspective view of interlocking system 136 of draw-out breaker assembly 100 in the rest position 200. Referring also to FIGS. 4A and 4B, in its rest position 200, components of racking interlocking system 136 in front panel 124 do not act on trip bar extension 164 coupled to trip bar 162. As such, breaker 102 can be fully operated, that is, breaker contacts 103 can change position (can be either open or closed). Racking access door stopper 142 protrudes out of front panel 124 and can be operated (pressed-in) by the operator. In the case that breaker contacts 103 are closed, contacts position indicator 170 protrudes out from breaker 102.

Figure 8B:
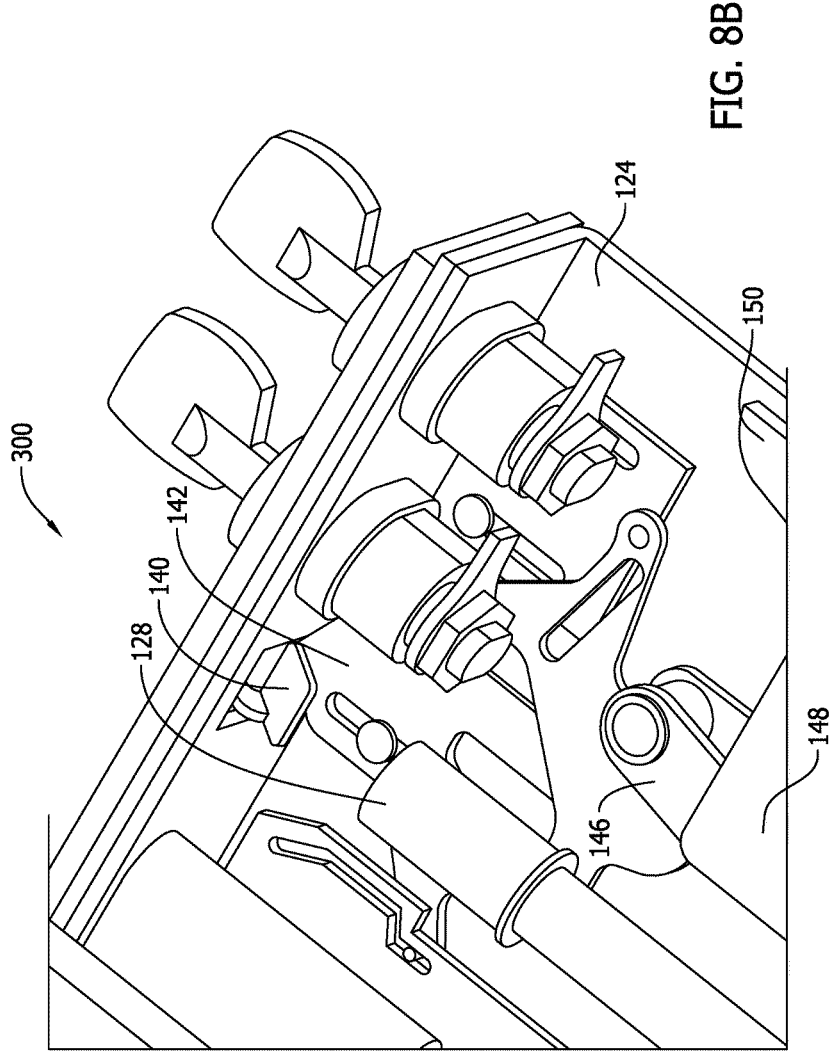
FIG. 8B is a rear perspective view of the interlocking system of the draw-out breaker assembly shown in FIG. 1 in the trip position.

FIG. 8A is a front perspective view of interlocking system 136 a trip position 300, and FIG. 8B is a rear perspective view of interlocking system 136 in trip position 300. Once an operator wants to change position of breaker 102 inside draw-out assembly 100, racking screw 128 needs to be accessed. To access racking screw 128, racking access door stopper 142 needs to be moved to the trip position, more specifically, stopper 142 is pressed in to front panel 124 to unlock racking access door 140. Movement of racking access door stopper 142 is translated through trip assembly 145, and more specifically, through tripping linkage 146 to actuation slider 148. As such, moving stopper 142 into the trip position causes movement of trip assembly 145 to the trip position. Sliding of actuation slider 148 results in movement of actuation cam system 150 that engages and acts on trip bar extension 164. Trip bar 162 rotates as a result and trips breaker mechanism 168 through actuator 166, thus opening breaker contacts 103.

To trip breaker 102, only half of the stroke of racking access door stopper 142 is required. In such a configuration, racking access door 140 is still blocked in such a way that it cannot be fully opened and access to racking screw 128 is prevented. As such, a second step, which is positive result of verification of breaker contacts 103 state, is required, as described herein.

If breaker 102 is properly tripped (no failure mode, breaker contacts 103 were open), contacts position indicator 170 remains inside breaker 102, enabling full stroke of racking access door stopper 142 in front panel 124, as described below.

Figure 10:
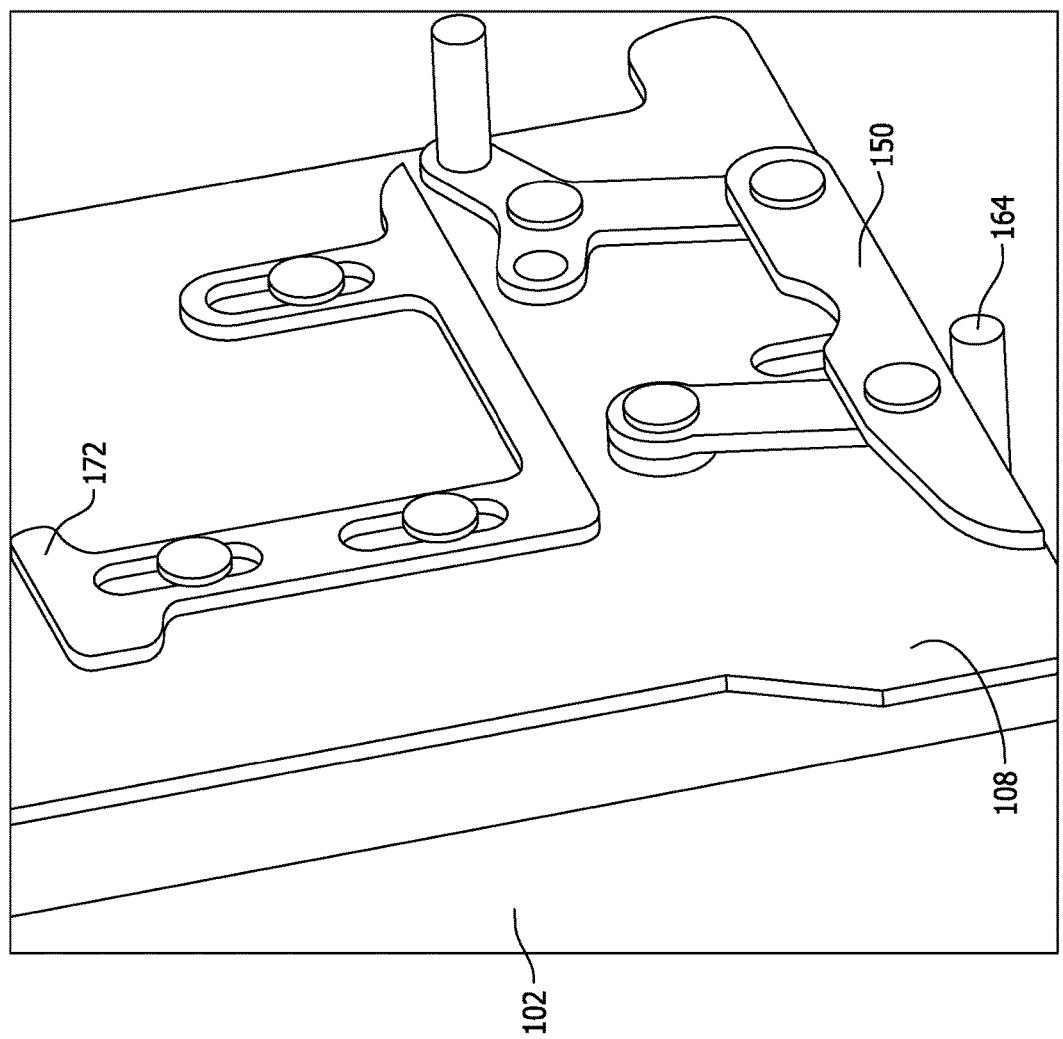
FIG. 10 is another perspective view of the interlocking system of the draw-out breaker assembly shown in FIG. 1 in a trip position when the contacts of the breaker are in the open position.

FIG. 9A is a front perspective view of interlocking system 136 in the trip position 300 when breaker contacts 103 are in the open position, FIG. 9B is a rear perspective view of interlocking system 136 in trip position 300, and FIG. 10 is another perspective view of interlocking system 136 in trip position 300 when breaker contacts 103 are in the open position. When breaker 102 is tripped and breaker contacts 103 are open, full stroke of racking access door stopper 142 in front panel 124 is possible.

Further movement of racking access door stopper 142 to an open position, which is translated through tripping linkage 146 to actuation slider 148 and further to actuation cam system 150 is possible only when breaker contacts 103 are open. In such a state, contact position indicator 170 is positioned inside breaker 102 and does not block movement of slider 172, which is acted upon by actuation cam system 150 to move passed contact position indicator 170. Once racking access door stopper 142 is fully pressed in, racking access door 140 can be fully opened providing access to racking screw 128.

When the position of breaker contacts 103 has been verified, a crank, or other tool, can then be inserted into opening 141 to engage racking screw 128 and subsequently rotated to rotate racking screw 128 and change the position of breaker 102 within assembly 100.

In case of a breaker 102 failure, when breaker contacts 103 would not be open, but trip signal was provided to breaker mechanism 168 (e.g. breaker contacts 103 were welded), contacts position indicator 170 will not remain inside the breaker 102. In such a case, movement of slider 172 on side sheet 108 will be blocked. As a result, a full stroke of racking access door stopper 142 will not be possible, and racking of breaker 102 is prevented.

Figure 11A:
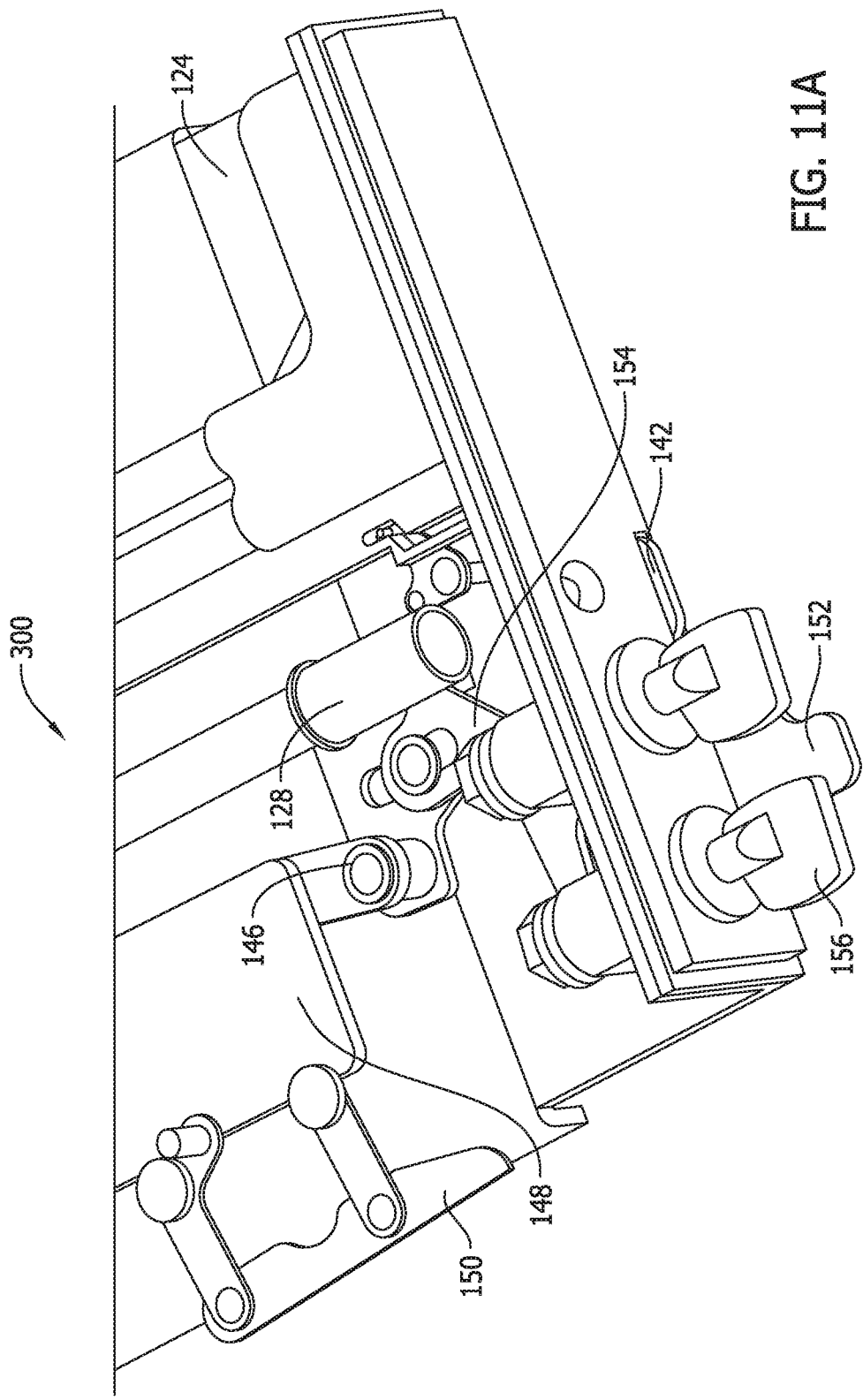
FIG. 11A is a front perspective view of the interlocking system of the draw-out breaker assembly shown in FIG. 1 in a trip position when the contacts of the breaker are in the open position and the breaker is locked.

FIG. 11A is a front perspective view of interlocking system 136 in trip position 300 when breaker contacts 103 are in the open position and breaker 102 is locked, and FIG. 11B is a rear perspective view of interlocking system 136 in trip position 300 when breaker contacts 103 are in the open position and breaker 102 is locked.

Additional functionality of interlocking system 136 built into front panel 124 is the possibility of locking draw-out assembly 100 such that the position of withdrawable breaker 102 inside base assembly 104 cannot be changed. Safety specifications require that draw-out assembly 100 locking be possible only when breaker 102 main contacts are open and only until breaker 102 reaches its test position (during rack-in). In such a test position, the main contacts of breaker 102 are disconnected from connection terminals 112 in base assembly 104, the secondary circuit of breaker 102 is connected to base assembly 104 allowing tests to be performed on breaker 102, and shutters 114 are closed to prevent access to connection terminals 114.

Verification of breaker 102 main contacts position is performed by fully pressing in racking access door stopper 142 in front panel 124. Once a full stroke of racking access door stopper 142 is possible (which means that breaker main contacts are open), padlock slider 152 can be pulled out from front panel 124 into a lock position. Such movement is possible because racking access door stopper 142 is fully pressed in and is no longer blocking movement of intermediate lever 154, which engages padlock slider 152 and also moves to the lock position. This displacement of intermediate lever 154 prevents the possibility of opening racking access door 140 such that access to racking screw 128 is blocked.

In the above described state, draw-out assembly 100 can be locked by keeping padlock slider 152 pulled out and installing a pad-lock, or by rotating key-lock 156 such that key lock latch 158 engages either intermediate lever 154 or padlock slider 152. When using key lock 156, after locking draw-out assembly 100, the key can be removed.

Figure 12A:
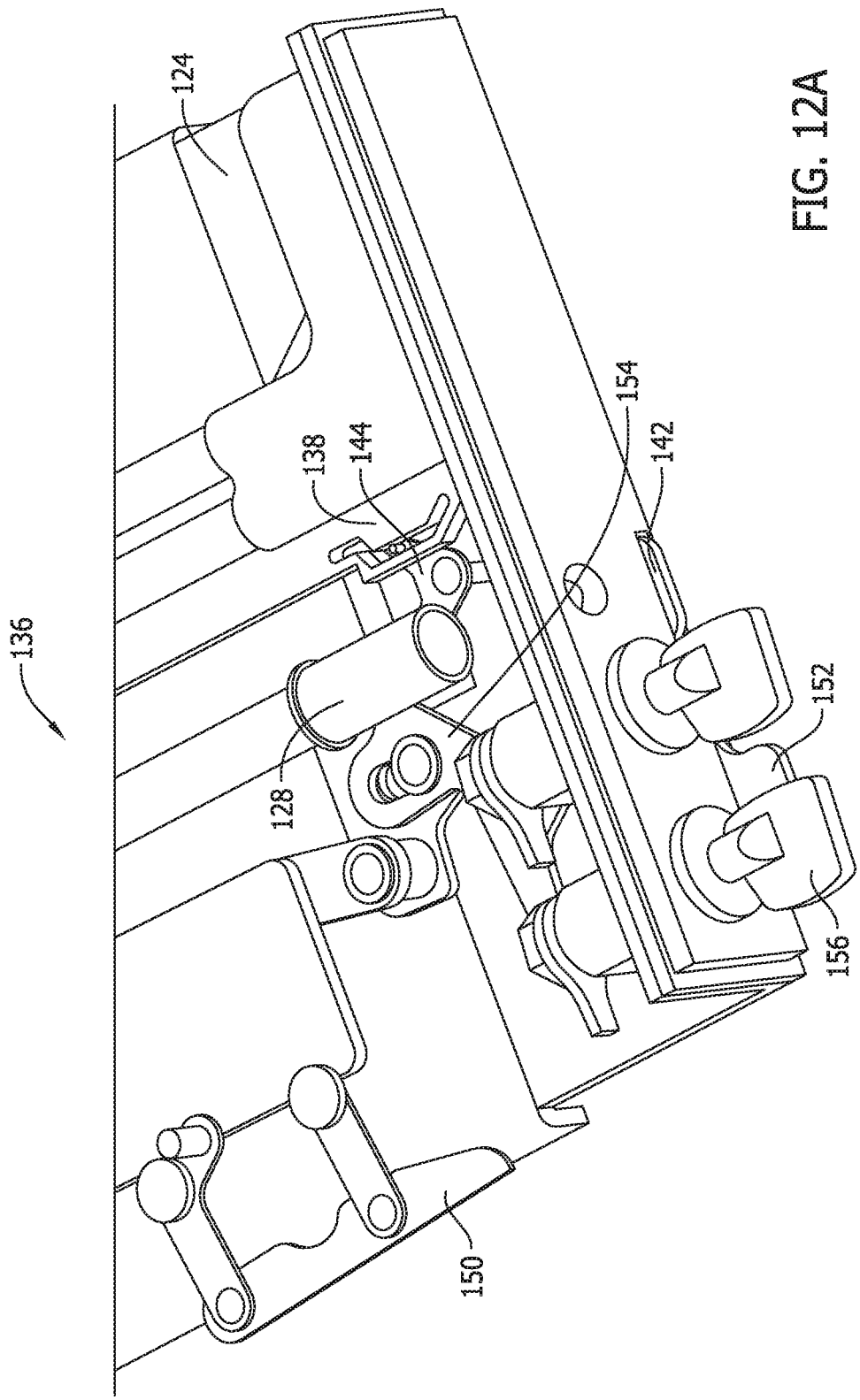
FIG. 12A is a front perspective view of the interlocking system of the draw-out breaker assembly shown in FIG. 1 when the breaker is between the test and connected position.
Figure 12B:
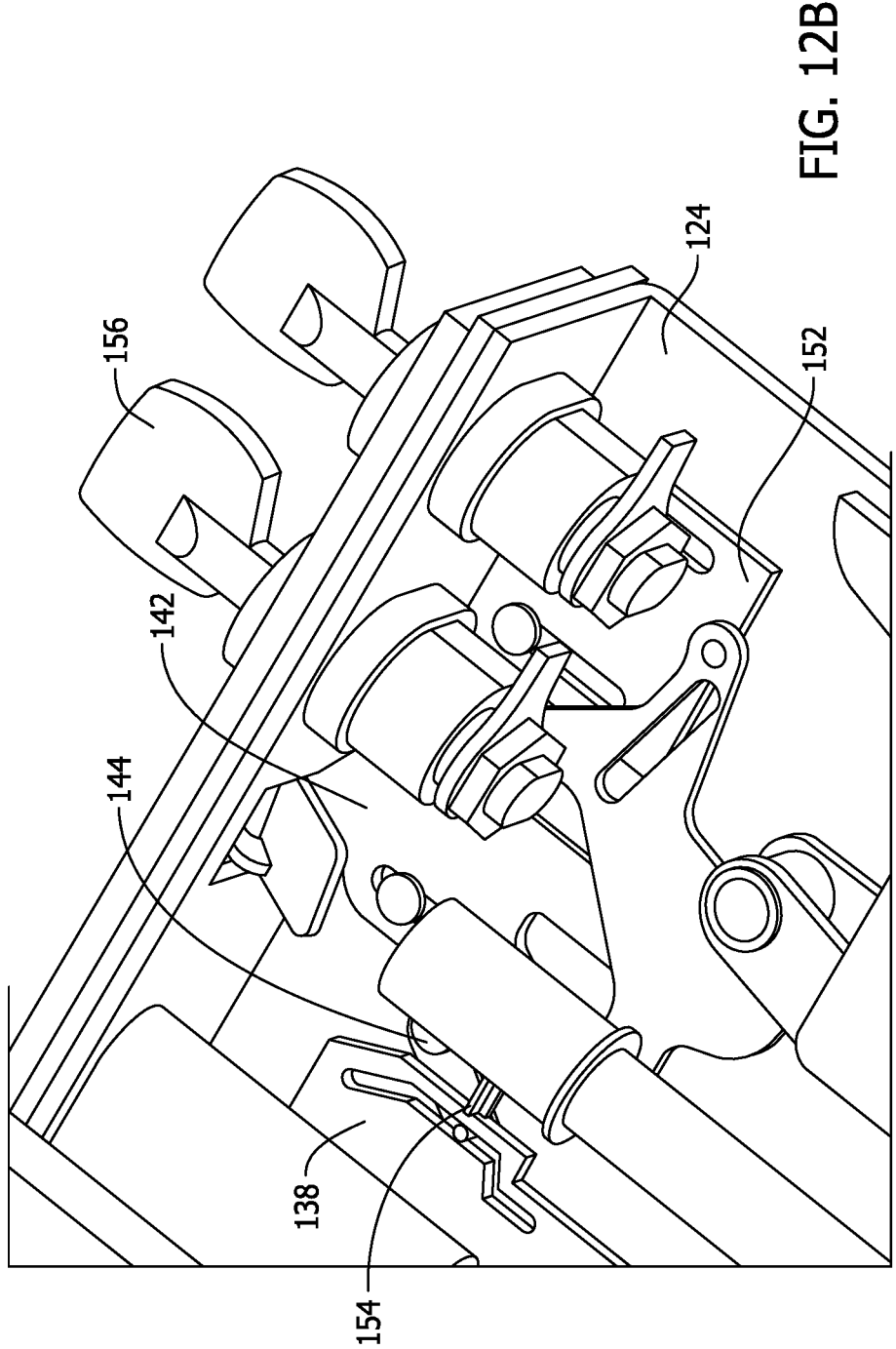
FIG. 12B is a front perspective view of the interlocking system of the draw-out breaker assembly shown in FIG. 1 when the breaker is between the test and connected position.

FIG. 12A is a front perspective view of interlocking system 136 of draw-out breaker assembly 100 when breaker 102 is between the test and connected position, and FIG. 12B is a front perspective view of interlocking system 136 breaker 102 is between the test and connected position.

When racking access door stopper 142 is fully pressed in into front panel 124, which is possible only after positive verification that breaker 102 main contacts are open, and breaker 102 racks-in from test position to connected position, or racks-out from connected position to test position, safety requirements necessitate that it be impossible to close the main contacts of breaker 102. As described herein, the test position is when the main contact system of breaker 102 is disconnected from base assembly connection terminals 112, the secondary circuit of breaker 102 is connected with draw out base assembly 104 to allow tests on breaker 102, and shutters 114 are closed to prevent access to connection terminals 112. Also, the connected position is when the main contact system breaker 102 is connected to base assembly connection terminals 112, the secondary circuit of breaker 102 is connected with draw out base assembly 104, and shutters 114 are open to allow access to connection terminals 112.

Such configurations are possible due to cam 144 being engaged with position indication linkage 138. In between test and connected positions, cam 144, driven by position indication link 138, is positioned to keep racking access door stopper 142 in its fully pressed in position such that a permanent trip signal is provided to breaker mechanism 168 and breaker 102 cannot be closed.

While racking breaker 102 in or out of draw-out breaker assembly 100, locking of draw-out breaker assembly 100 is impossible. Once withdrawable breaker 102 leaves the test position, position indication link 138 blocks possibility of intermediate lever 154 rotation. In such a case, padlock slider 152 cannot be pulled out of front panel 124 and a pad-lock cannot be installed, or key-locks 156 cannot be rotated.

Exemplary embodiments of apparatuses are described herein for use in preventing power from being applied to devices, such as a circuit breaker, when the devices are not fully engaged within a draw-out assembly. These embodiments facilitate safer operation of a circuit breaker. The systems, method, and apparatus described herein facilitate a method for racking a circuit breaker in a draw-out breaker assembly. In particular, the systems, method, and apparatus described herein include an interlocking system that provides a trip signal to the circuit breaker to position a plurality of breaker contacts in an open position. To provide the trip signal, the interlocking system is moved to a trip position. More specifically, an access door stopper is actuated to the trip position, which causes an access door to partially open preventing access to a racking screw, and also causes actuation of a trip assembly to the trip position to engage and rotate a trip bar of the circuit breaker to facilitate tripping the breaker and opening the contacts.

Furthermore, the interlocking system verifies the position of the contacts to confirm that the contacts are indeed open and that a failure has not occurred. In the event of a failure, a contacts position indicator of the interlocking assembly moves from an open position to a failure position and extends from the breaker into the path of the trip assembly. To verify the position, the interlocking system is moved to an open position. More specifically, the access door stopper is actuated to the open position, which causes actuation of a trip assembly to the open position. If there is no failure and the contacts are open, then the trip assembly moves passed and does not contact the contacts position indictor, and the access door is able to fully open allowing access to the racking screw. If there has been a failure and the contacts are closed, the trip assembly will contact the contacts position indicator and prevent trip assembly from further actuation, which prevents the access door from fully opening, therefore preventing access to the racking screw.

The systems, method, and apparatus described herein provide a two-step safety feature during breaker rack-in/out movement. In the first step, a trip signal is provided to the breaker to open the main contact system. In the second step, verification that the main contacts of the breaker are disconnected is performed to protect against any potential failure inside the breaker. The system described herein prevents rack-in/out movement of the breaker when its main contacts are closed. It also provides proper logic of the locking system (key-locking and padlocking), such that draw-out assembly can be locked only if the breaker is in proper position in the draw-out assembly (either the disconnected or test position) and ensures the main breaker contacts are open before locking.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a draw-out breaker assembly including a circuit breaker having a plurality of contacts, said method comprising:
   coupling an interlock system to a front panel of a base assembly, wherein coupling the interlock system comprises:
      coupling an access door to the front panel such that the access door selectively covers an opening formed in the front panel;
      coupling an access door stopper to the front panel and to the access door, wherein the access door stopper is selectively moveable between a first trip position and a first open position; and
      coupling a racking screw to the front panel and to the plurality of contacts;
   coupling a trip assembly to the front panel and to the access door stopper, wherein the trip assembly is selectively moveable between a second trip position and a second open position, such that:
      i) when the access door stopper is in the first trip position,
      ii) when the trip assembly is moved to the second trip position by the access door stopper to engage a trip bar of the circuit breaker, and
      iii) when the access door is partially opened such that access to the racking screw through the opening is prevented, a trip signal is provided to the circuit breaker to position the plurality of contacts in a third open position, and
   such that:
      i) when the access door stopper is moved to the first open position,
      ii) when the trip assembly is moved to the second open position by the access door stopper, and
      iii) when the access door is fully opened by the trip assembly to enable access to the racking screw, a position of the plurality of contacts is confirmed.

2. The method in accordance with claim 1, wherein the coupling the trip assembly comprises coupling the trip assembly such that when the trip bar is rotated, using the trip assembly, the trip signal is provided to the circuit breaker to trip the circuit breaker.

3. The method in accordance with claim 1, wherein the coupling the trip assembly comprises:
   coupling a trip link of the trip assembly to the access door stopper;
   coupling an actuation slider to the trip link; and
   coupling an actuation cam system to the actuation slider.

4. The method in accordance with claim 1, wherein the coupling the trip assembly comprises:
   coupling a trip bar extension to the trip bar such that moving the trip assembly to the second trip position causes rotation of the trip bar extension and the trip bar; and
   coupling an actuator to the trip bar extension and to a circuit breaker mechanism such that the rotation of the trip bar causes linear movement of the actuator to trip the circuit breaker mechanism.

5. The method in accordance with claim 1, wherein the coupling the access door stopper to the front panel comprises coupling the access door stopper to the front panel such that a portion of the access door stopper extends through the front panel.

6. The method in accordance with claim 1, further comprising coupling a contacts position indicator to the circuit breaker such that when the trip assembly is moved to the second open position, the trip assembly advances passed the contacts position indicator in the circuit breaker to enable the access door to fully open.

7. The method in accordance with claim 1, further comprising removably coupling a tool, by inserting the tool through the opening in the front panel, to the racking screw such that rotation of the tool causes rotation of the racking screw to rack the circuit breaker.

8. The method in accordance with claim 1, wherein the coupling the interlocking system further comprises coupling a lock link to the front panel such that the lock link is moveable between a first locked position and a first unlocked position.

9. The method in accordance with claim 8, wherein the coupling the interlocking system further comprises coupling a lever link to the lock link such that the lever link is moveable between a second locked position and a second unlocked position, wherein, when the lock link is in the first locked position and the lever link is in the second locked position, opening of the access door is prevented.

10. The method in accordance with claim 9, further comprising:
    coupling a key lock to the front panel; and
    coupling a key lock latch to the key lock and to the lock link such that rotation of the key lock and key lock latch prevents movement of the lock link.

11. An interlocking system for a draw-out circuit breaker assembly including a circuit breaker having a plurality of contacts, said interlocking system comprising:
    a racking screw coupled to the plurality of contacts that changes a position of the circuit breaker within the draw-out circuit breaker assembly when engaged by a tool;
    a front panel defining an opening through which said racking screw is selectively accessible;
    an access door coupled to said front panel and configured selectively cover the opening to selectively provide access to said racking screw;
    an access door stopper coupled to and at least partially extending through said front panel, said access door stopper configured to limit movement of said access door based on a position of the plurality of contacts; and
    a trip assembly coupled to said access door stopper, wherein said access door is moveable between a first trip position and a first open position, said access door stopper is moveable between a second trip position and a second open position, and said trip assembly is moveable between a third trip position and a third open position, wherein moving said access door to the first trip position, said access door stopper to the second trip position, and said trip assembly to the third trip position triggers delivery of a trip signal to the circuit breaker to open the plurality of contacts, and wherein, in the first open position the access door is fully open to enable access to said racking screw through said front panel.

12. The interlocking system in accordance with claim 11, wherein said access door stopper in the second trip position and said trip assembly in the third trip position provide the trip signal to the circuit breaker to open the plurality of contacts, and wherein said access door stopper is fully open to enable access to said racking screw through said front panel in the first open position to verify an open position of the plurality of contacts.

13. The interlocking system in accordance with claim 12, wherein said trip assembly comprises a trip link coupled to said access door stopper, an actuation slider coupled to said trip link, and an actuation cam system coupled to said actuation slider, wherein said actuation cam system engages a trip bar of the circuit breaker to provide the trip signal.

14. The interlocking system in accordance with claim 11, wherein, in the first trip position, said access door prevents access to said racking screw and, in the first open position, said access door allows access to said racking screw.

15. The interlocking system in accordance with claim 11, further comprising a contacts position indicator moveable between a fourth open position and a failure position corresponding to the position of the plurality of contacts, wherein said contacts position indicator, in the fourth open position, enables movement of said trip assembly to the third open position and wherein said contacts position indicator, in the failure position, prevents movement of said trip assembly to the third open position.

16. The interlocking system in accordance with claim 11, wherein movement of said access door stopper to the second trip position causes movement of said trip assembly to the third trip position.

17. The interlocking system in accordance with claim 11, wherein movement of said access door stopper to the second trip position causes movement of said access door to the first trip position.

18. The interlocking system in accordance with claim 17, wherein movement of said access door stopper to the second open position causes movement of said access door to the first open position.

19. The interlocking system in accordance with claim 11, further comprising a lock link moveable between a first lock position and a first unlock position, wherein said lock link is configured to prevent movement of the circuit breaker.

20. The interlocking system in accordance with claim 19, further comprising a lever link coupled to said lock link and to said access door, said lever link moveable between a second lock position and a second unlock position, wherein, in the second lock position, said lever link prevents movement of said access door.

* * * * *